US012538366B2

(12) United States Patent
Aoyagi et al.

(10) Patent No.: US 12,538,366 B2
(45) Date of Patent: Jan. 27, 2026

(54) BASE STATION AND COMMUNICATION CONTROL APPARATUS

(71) Applicant: NTT DOCOMO, INC., Tokyo (JP)

(72) Inventors: Kenichirou Aoyagi, Tokyo (JP); Takashi Koshimizu, Tokyo (JP); Hiroshi Ishikawa, Tokyo (JP); Keiichi Kanbara, Tokyo (JP); Na Yo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/754,207

(22) PCT Filed: Oct. 9, 2018

(86) PCT No.: PCT/JP2018/037628
§ 371 (c)(1),
(2) Date: Apr. 7, 2020

(87) PCT Pub. No.: WO2019/073985
PCT Pub. Date: Apr. 18, 2019

(65) Prior Publication Data
US 2020/0275497 A1    Aug. 27, 2020

(30) Foreign Application Priority Data

Oct. 10, 2017  (JP) ................. 2017-197234

(51) Int. Cl.
*H04W 76/12* (2018.01)
*H04W 24/08* (2009.01)
(Continued)

(52) U.S. Cl.
CPC ........... *H04W 76/12* (2018.02); *H04W 24/08* (2013.01); *H04W 84/045* (2013.01); *H04W 88/08* (2013.01)

(58) Field of Classification Search
CPC ..... H04W 24/08; H04W 76/12; H04W 76/15; H04W 28/08; H04W 72/04
See application file for complete search history.

(56) References Cited

U.S. PATENT DOCUMENTS

2015/0334769 A1* 11/2015 Kim ................. H04L 5/001
370/329
2017/0013668 A1  1/2017 Chang et al.
(Continued)

FOREIGN PATENT DOCUMENTS

| CN | 106797614 A | 5/2017 |
| JP | 2016-524420 A | 8/2016 |
| JP | 2017-514367 A | 6/2017 |

OTHER PUBLICATIONS

International Search Report issued in PCT/JP2018/037628 mailed on Jan. 8, 2019 (3 pages).
(Continued)

*Primary Examiner* — Syed Ali
(74) *Attorney, Agent, or Firm* — Osha Bergman Watanabe & Burton LLP

(57) ABSTRACT

A base station used in a communication system comprising a core network, and a first and second base stations both of which are connected to the core network, wherein the base station being used as the first base station, the base station comprising: a network communication unit that receives a bearer setting request from the core network; and a bearer control unit that determines, when performing bearer setting based on the bearer setting request, whether or not a predetermined condition is met, and, when the predetermined condition is met, decides not to set a bearer that connects the second base station and the core network to each other or to restrain from setting the bearer.

2 Claims, 13 Drawing Sheets

(51) Int. Cl.
  *H04W 84/04* (2009.01)
  *H04W 88/08* (2009.01)

(56) References Cited

U.S. PATENT DOCUMENTS

| | | | |
|---|---|---|---|
| 2017/0150387 A1* | 5/2017 | Fujishiro | H04W 72/54 |
| 2017/0289906 A1 | 10/2017 | Tamura et al. | |
| 2019/0268819 A1* | 8/2019 | Kim | H04W 36/0058 |
| 2020/0029237 A1* | 1/2020 | Kim | H04W 68/06 |
| 2020/0029262 A1* | 1/2020 | Kim | H04W 36/0085 |
| 2020/0029297 A1* | 1/2020 | Baek | H04W 76/11 |
| 2020/0214073 A1* | 7/2020 | Shimoda | H04W 16/32 |
| 2020/0275315 A1* | 8/2020 | Futaki | H04W 76/20 |
| 2020/0329408 A1* | 10/2020 | Selvaganapathy | H04W 36/0069 |
| 2020/0336957 A1* | 10/2020 | Wu | H04W 36/0085 |
| 2021/0298104 A1* | 9/2021 | Akiyoshi | H04W 76/16 |
| 2022/0256412 A1* | 8/2022 | Kim | H04W 28/06 |
| 2022/0408305 A1* | 12/2022 | Jin | H04W 28/10 |

OTHER PUBLICATIONS

Written Opinion of the International Searching Authority issued in PCT/JP2018/037628 mailed on Jan. 8, 2019 (3 pages).
3GPP TR 38.801 V14.0.0; "3rd Generation Partnership Project; Technical Specification Group Radio Access Network; Study on new radio access technology: Radio access architecture and interfaces (Release 14)"; Mar. 2017 (91 pages).
3GPP TS 23.401 V15.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 15)"; Sep. 2017 (397 pages).
Office Action issued in the counterpart Chinese Patent Application No. 201880065191.6, mailed on Jan. 5, 2023 (18 pages).
Office Action issued in Chinese Application No. 201880065191.6; Dated Aug. 11, 2023 (14 pages).

* cited by examiner

MCG split bearer

SCG split bearer

BASE STATION AND COMMUNICATION CONTROL APPARATUS

TECHNICAL FIELD

The present invention relates to setting of a bearer as a packet communication path in a communication system.

BACKGROUND ART

Currently, wireless services using LTE (referred to as 4G) have been widely provided. At 3GPP, studies on a wireless communication scheme called 5G have been underway in order to achieve a further increase in system capacity, a further increase in data transmission speed, and a further reduction in delay in a wireless segment relative to 4G. For 5G, a variety of techniques have been studied in order to meet a requirement of achieving a throughput of 10 Gbps or higher while reducing a delay in a wireless segment to be 1 ms or less. A wireless network that supports 5G is referred to as a new radio (NR).

Further, for 5G, in order to achieve ultrafast speed, larger capacity and ultralow delay, use of high frequency bands, which easily ensure a wideband, has been considered in addition to already-existing low frequency bands.

RELATED-ART DOCUMENTS

Patent Document

None-Patent Document 1: 3GPP TR 38.801 V14.0.0 (2017-03)
None-Patent Document 2: 3GPP TS 23.401 V15.1.0 (2017-09)

SUMMARY OF THE INVENTION

Problem to be Solved by the Invention

In preparation for the introduction of 5G, connecting, without using a 5G core network, a 4G base station eNB and a 5G base station gNB to each other with Dual connectivity and connecting these base stations to a 4G core network (EPC) has been studied as one of methods for migrating from 4G to 5G.

In the above configuration, it is envisaged that a base station eNB forms a macro cell that works as C-plane and U-Plane, a plurality base stations gNB are arranged in the macro cell area and each base station gNB forms a small cell that works as U-plane to achieve further higher data rate. In such a communication environment, it is believed that switching of SCG bearers occurs frequently with movement of a user equipment UE. Thus, there is a problem that a core network load may increase due to an increase in signaling.

In view of the above, it is an object of the present invention to provide a technique that can avoid an increase in a core network load associated with bearer switching in a communication system having a first base station and a second base station.

Means to Solve the Problem

According to the disclosed technique, there is provided a base station used in a communication system comprising a core network, and a first and second base stations both of which are connected to the core network, wherein the base station being used as the first base station, the base station comprising:
a network communication unit that receives a bearer setting request from the core network; and
a bearer control unit that determines, when performing bearer setting based on the bearer setting request, whether or not a predetermined condition is met, and, when the predetermined condition is met, decides not to set a bearer that connects the second base station and the core network to each other or to restrain from setting the bearer.

Advantage of the Invention

According to the disclosed technique, there is provided a technique that can avoid an increase in core network load associated with bearer switching in a communication system that has a first base station and a second base station.

MODE FOR CARRYING OUT THE INVENTION

Hereinafter, an embodiment of the present invention (present embodiment) will be described with reference to the drawings. It should be noted that the embodiment described below are merely an example, and embodiments to which the present invention is applied are not limited to the following.

In the embodiment described below, terms, such as channel names and signal names, that have been used in conjunction with existing LTE will be used. However, similar channels and signals may be referred to by different names.

System Configuration

Figure 1:
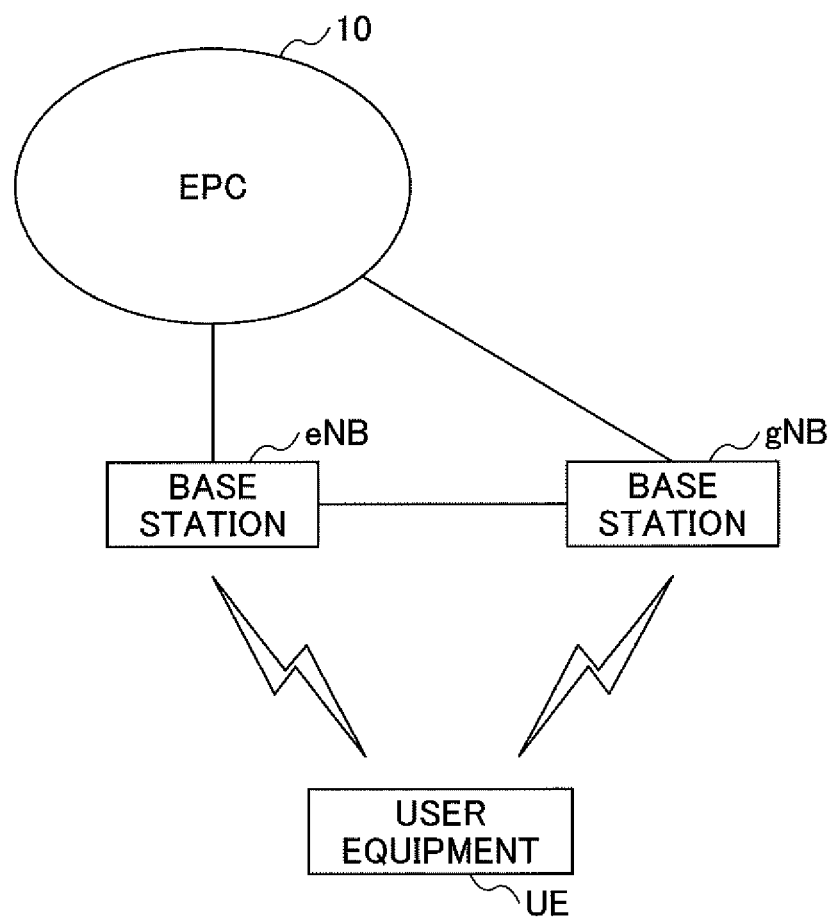
FIG. 1 is a whole configuration diagram of a communication system according to an embodiment of the present invention.

FIG. 1 is a diagram illustrating a configuration of a communication system in the present embodiment. As shown in FIG. 1, the communication system has a base station eNB as an LTE base station and a base station gNB as a 5G (NR) base station, and a user equipment UE can communicate with the base station eNB and the base station gNB using Dual Connectivity (DC).

Further, in this communication system, the base station eNB and the base station gNB are connected to an evolved packet core (EPC) 10 as an LTE core network.

A basic process in DC between LTE and NR is similar to that of DC in LTE. In DC, a Master-eNB (MeNB) and a secondary-eNB (SeNB) (in the present embodiment gNB is used for secondary-eNB) are introduced. In DC, a cell group formed by (one or more) cells under MeNB is referred to as a master cell group (MCG) and a cell group formed by (one or more) cells under SeNB is referred to as a secondary cell group (SCG). An UL component carrier (CC) is configured to at least one SCell of SCG, and PUCCH is configured to one of the Scells to which UL CC is configured. This SCell is referred to as a primary SCell (PSCell).

Figure 2:
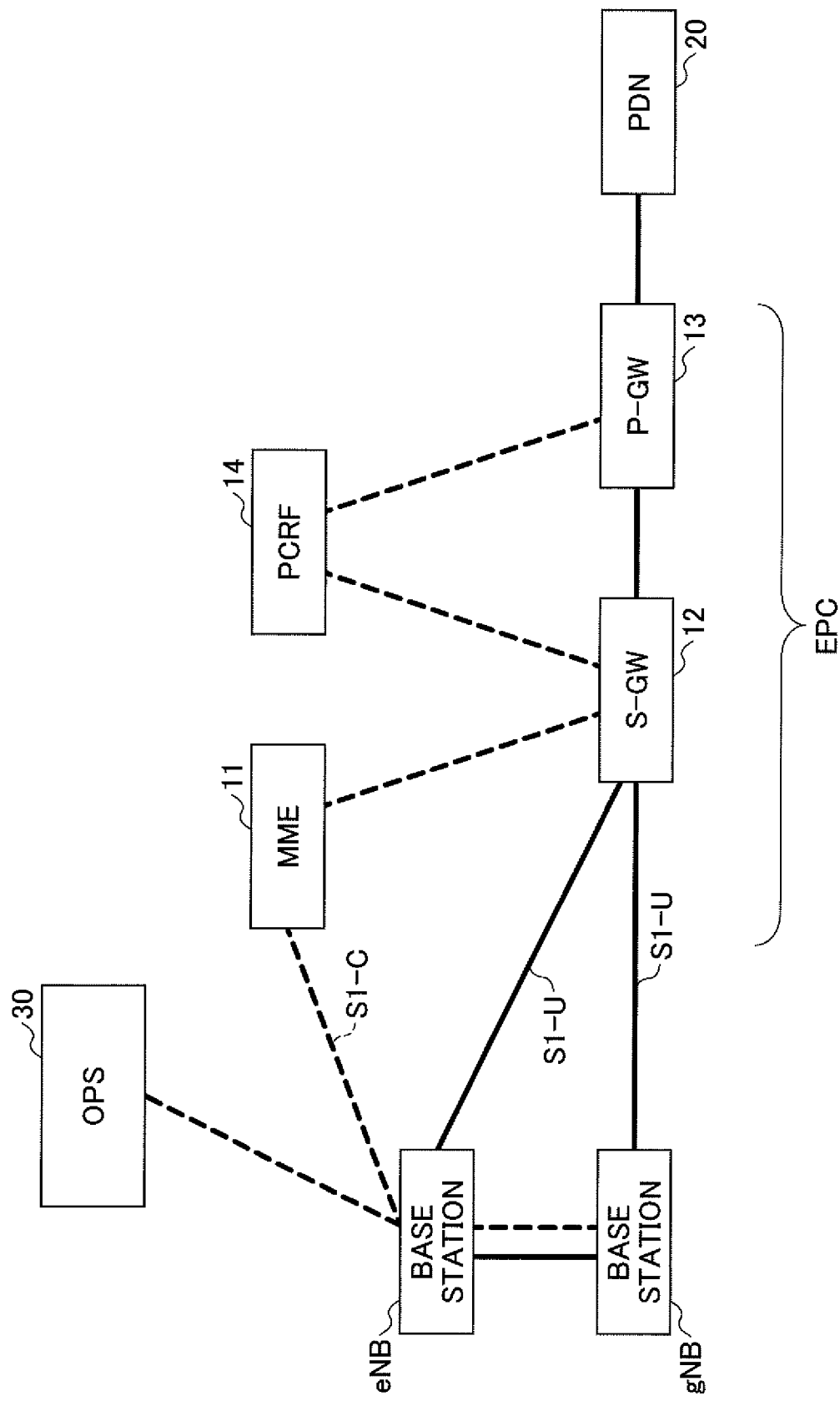
FIG. 2 is a diagram illustrating a configuration of EPC 10.

FIG. 2 illustrates a configuration of EPC 10. As shown in FIG. 2, EPC 10 has each of the following apparatuses: a mobile management entity (MME) 11, a serving gateway (S-GW) 12, a packet data network gateway (P-GW) 13, and a policy and charging rules function (PCRF) 14. It should be noted that a packet data network (PDN) 20 connected to the P-GW 13 is an external network to which EPC 10 is connected. In FIG. 2, dotted lines indicate a control signal interface and solid lines indicate a user data interface.

MME 11 is a node that accommodates a base station and performs mobility control. S-GW 12 is a residing gateway that houses a 3GPP access system. P-GW 13 is a connection point to the PDN 20 and is a gateway that performs assigning of an IP address and packet transmission to S-GW 12. PCRF 14 is a node that performs control for QoS of user data transmission and charging.

Further, as shown in FIG. 2, an operation system (OPS) 30 is provided. OPS (Operation system) 30 includes a function of collecting information on a condition of EPC 10 such as on congestion or failure or the like and sending to the base station eNB notification information based on the collected information. OPS 30 may be provided in EPC 10 or in a network outside EPC 10. In the present embodiment, MME 11 also includes a function of collecting information on a condition of EPC 10 such as on congestion or failure or the like and sending to the base station eNB notification information based on the collected information. OPS 30 and MME 11 may be collectively referred to as a communication control apparatus.

Figure 3:
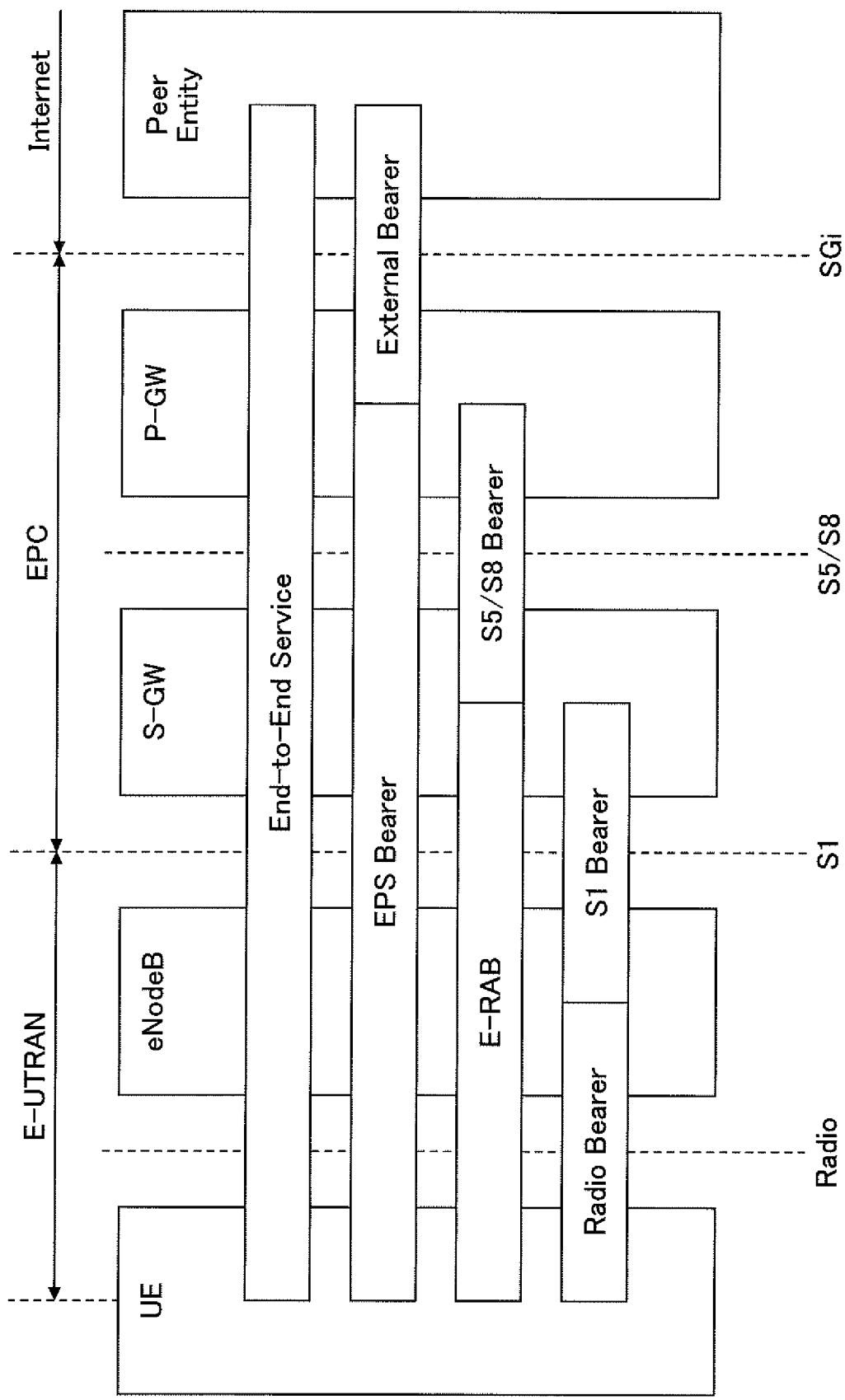
FIG. 3 is a diagram illustrating an exemplary configuration of a bearer.

When a user equipment UE performs data communication with a pear entity, a bearer is set between the user equipment UE and the pear entity. A bearer is a unidirectional or bidirectional packet communication path. More specifically, as shown in FIG. 3, an end-end bearer is one that is formed by combining various bearers between nodes.

Figure 4A:
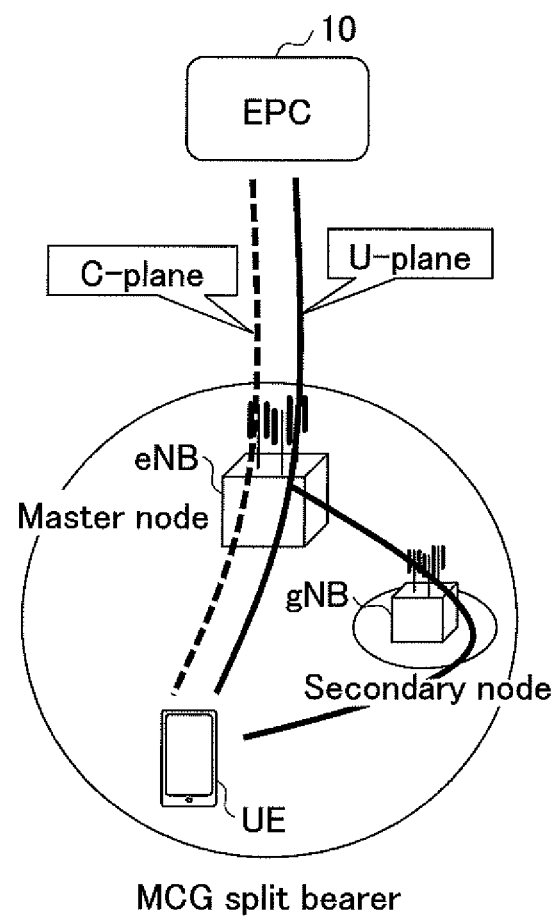
FIG. 4A is a diagram illustrating how to stream U-plane data in the embodiment of the present invention.
Figure 4B:
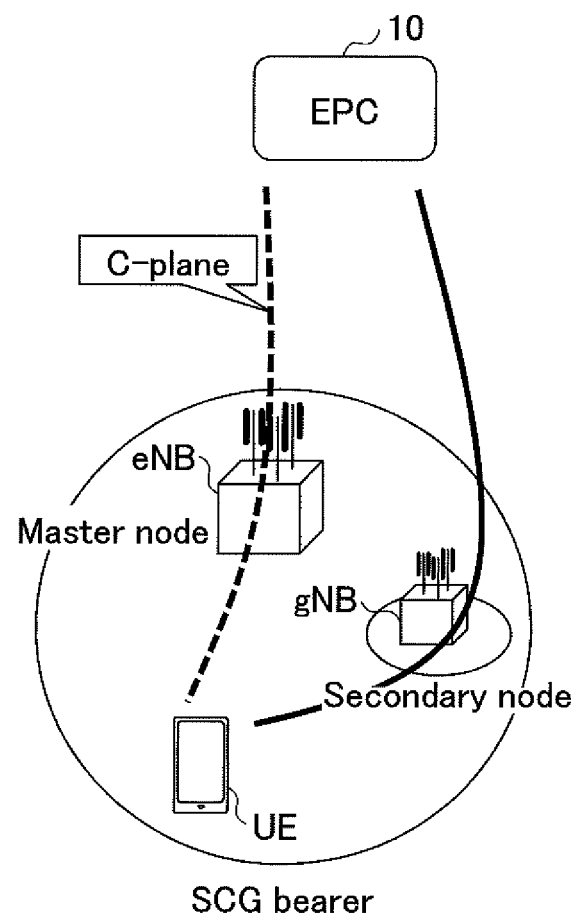
FIG. 4B is a diagram illustrating how to stream U-plane data in the embodiment of the present invention.
Figure 4C:
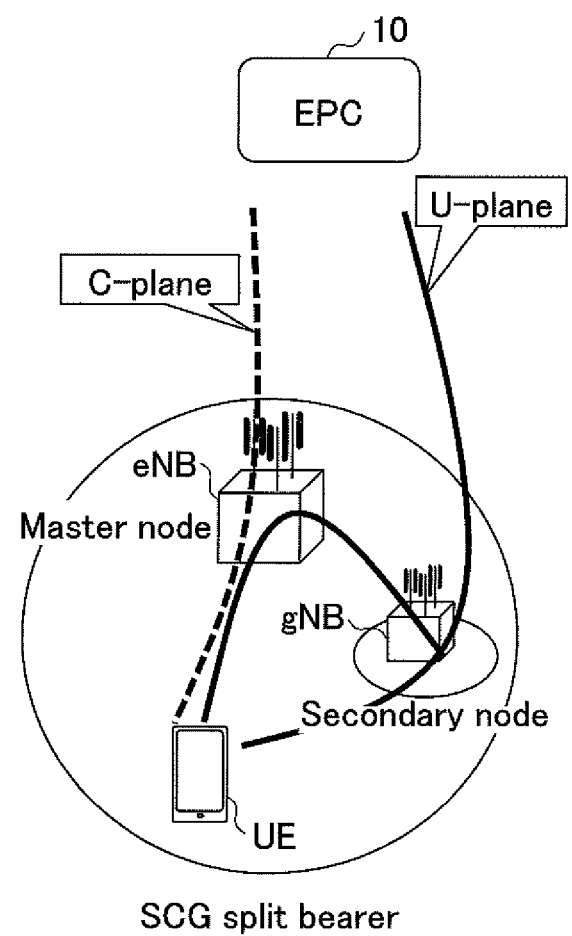
FIG. 4C is a diagram illustrating how to stream U-plane data in the embodiment of the present invention.

As an example of streaming U-plane data in the DC configuration shown in FIG. 1, there are three kinds of methods as shown in FIGS. 4A to 4C: a MCG split bearer (FIG. 4A), a SCG bearer (FIG. 4B) and a SCG split bearer (FIG. 4C) (see None-Patent Document 1, for example).

In comparison with the MCG bearer configuration (FIG. 4A) in which U-Plane data is streamed using MCG, in the SCG bearer or SCG split bearer configuration (FIGS. 4B, 4C) (hereinafter referred to as a SCG bearer/split bearer), a U-plane switching request (signaling) occurs in the core network (EPC 10) when switching (adding/changing/removing) SCG (5G cell).

In particular, in the LTE-NR DC configuration, it is envisaged that a MCG is configured as a macro cell that covers a wide range at a preexisting frequency band and a SCG is configured as a number of small cells that cover a narrow range at a high frequency band within the range of the micro cell. Further, in the small cells, high speed broadband data communication is possible. Thus, when a user equipment UE resides in the small cell area, the user equipment UE is expected to perform data communication using SCG. In that case, it is envisaged that switching (adding/changing/removing) of SCG takes place frequently due to movement of the user equipment UE.

Figure 5:
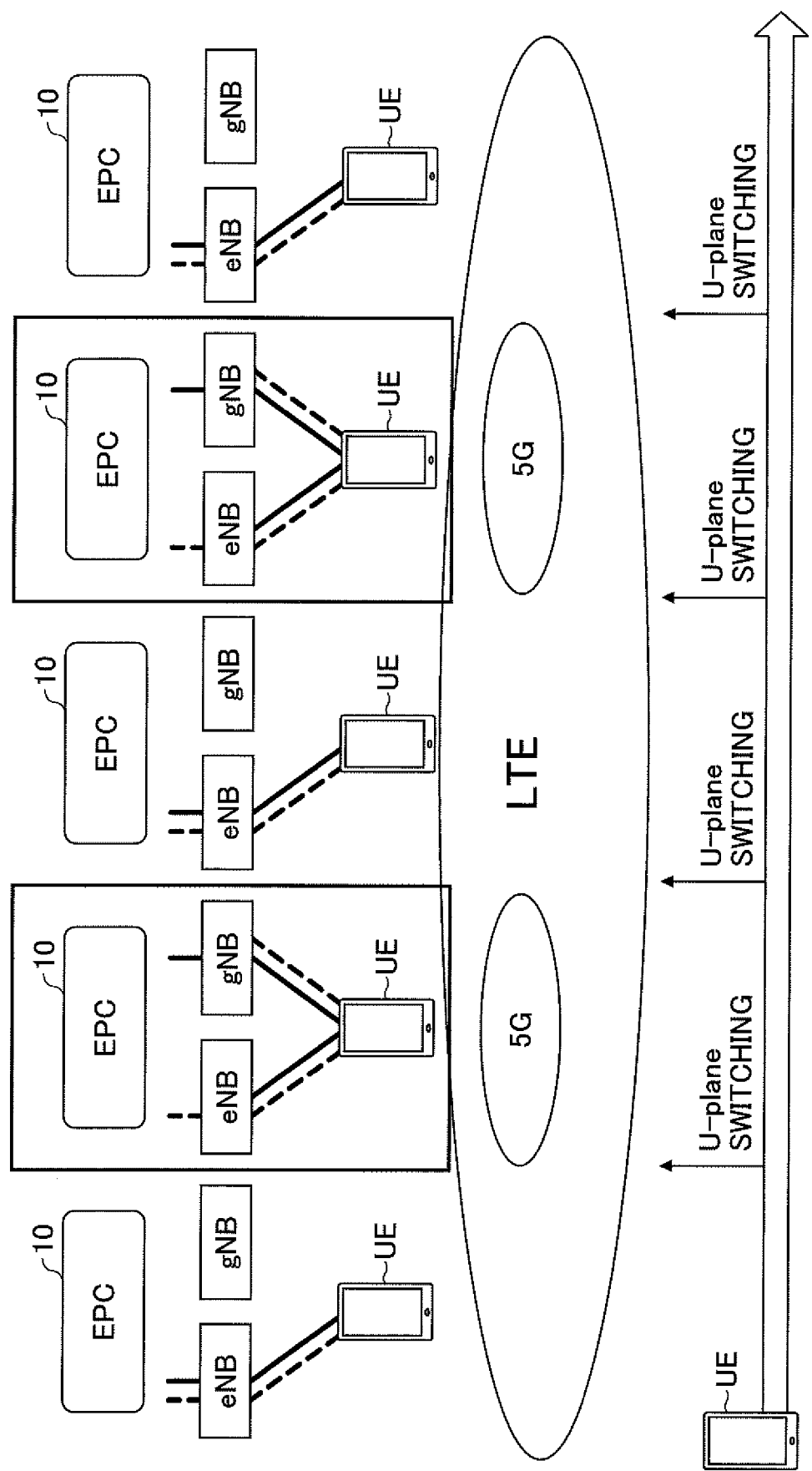
FIG. 5 is a diagram illustrating switching of U-Plane when using SCG bearer/split bearer.

FIG. 5 is a diagram illustrating such a switching condition. In FIG. 5, every time the user equipment UE enters/exits the SCG (5G cell) area, SCG bearer/split bearer is configured/removed. When switching takes place frequently, core network load could increase due to an increase in signaling. Thus, in such a situation, it is desirable to provide 5G by setting MCG bearer.

In the present embodiment, when setting a bearer, a base station eNB does not set SCG bearer/split bearer when it determines that a predetermined condition is met, thereby avoiding or restraining frequent switching. Hereinafter, processes therefor will be described in detail. It should be noted that a SCG bearer/split bearer is an example of "a bearer for connecting a base station gNB and the core network (EPC 10)."

Regarding Bearer Setting

Figure 6:
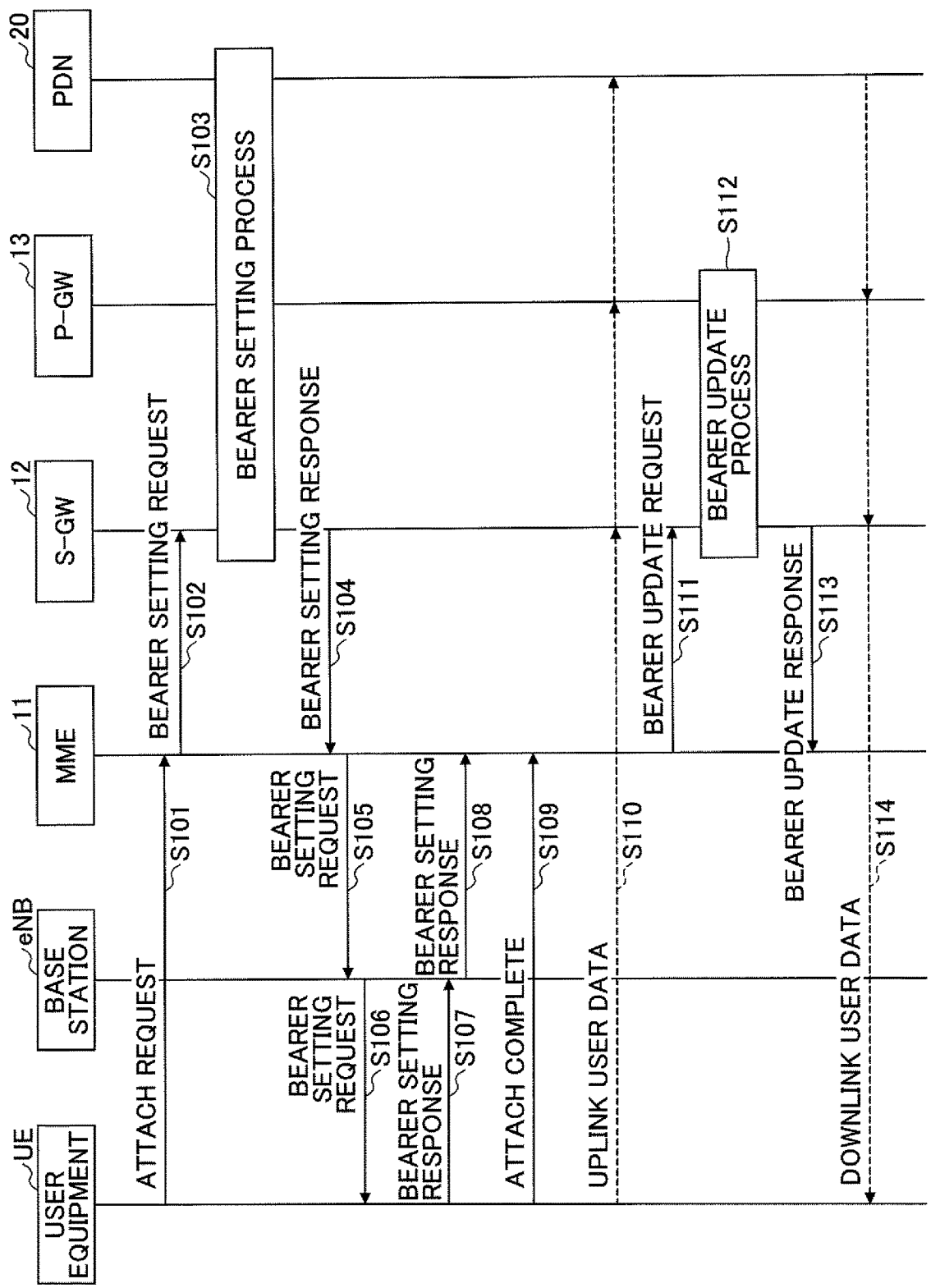
FIG. 6 is a diagram illustrating an example of bearer setting process.

As described above, a base station eNB determines, when performing bearer setting, whether or not to set a SCG bearer/split bearer. Thus, first, a basic process flow of the bearer setting will be described with reference to FIG. 6. FIG. 6 illustrates an example of typical bearer setting without using a MCG bearer or DC. Further, FIG. 6 illustrates bearer setting at the time of attach as an example.

A user equipment UE sends an attach request signal (including APA as a connection point name) to MME 11 (S101). On the basis of the APN, MME 11 selects, by DNS, S-GW 12 and P-GW 13 to which a bearer is to be set, and sends a bearer setting request signal to the selected S-GW 12 (S102).

The S-GW 12 performs a bearer setting process on the P-GW 13 set in the bearer setting request signal (S103). When the setting of a bearer between the S-GW 12 and the P-GW 13 is completed, the S-GW 12 sends transmission information for the base station eNB as a bearer setting response (S104). It should be noted that the transmission information includes bearer quality information (QoS), a bearer ID and a traffic flow template (TFT) and the like.

The MME 11 sends to the base station eNB the transmission information received from the S-GW 12 as a bearer setting request (S105). The base station eNB establishes a radio bearer between itself and the user equipment UE, receives a bearer setting response signal from the user equipment UE and sends to the MME 11 transmission information for the S-GW 12 (S106-S108).

Upon receiving an attach completion signal from the user equipment UE (S109), the MME 11 sends to the S-GW 12 the transmission information received from the base station eNB as a bearer update request (S111). It should be noted that at S110 transmission of uplink user data begins.

On the basis of the received transmission information, the S-GW 12 ends bearer setting between the base station eNB and the S-GW 12 (S112, S113). Further, at S114, transmission of downstream user data starts.

Although FIG. 6 illustrates an example in which the user equipment UE attaches to the EPC 10, bearer setting (i.e., determining whether or not to set SCG bearer/split bearer) may occur in a variety of situations other than at the time of attach. For example, when the MME 11 receives a service request from the user equipment UE, the MME 11 sends a bearer setting request to the base station eNB, and the base station eNB performs bearer setting based on the bearer setting request.

Here, it is considered that when the base station eNB receives the bearer setting request and determines, on the basis of bearer quality information (QCI) included in the bearer setting request, that it is necessary to set a high speed and high quality (low delay) bearer, the base station eNB may set a SCG bearer/split bearer when a predetermined condition as described below is not met ((e.g., when the core network is available, when an amount of signaling is small).

Figure 7:
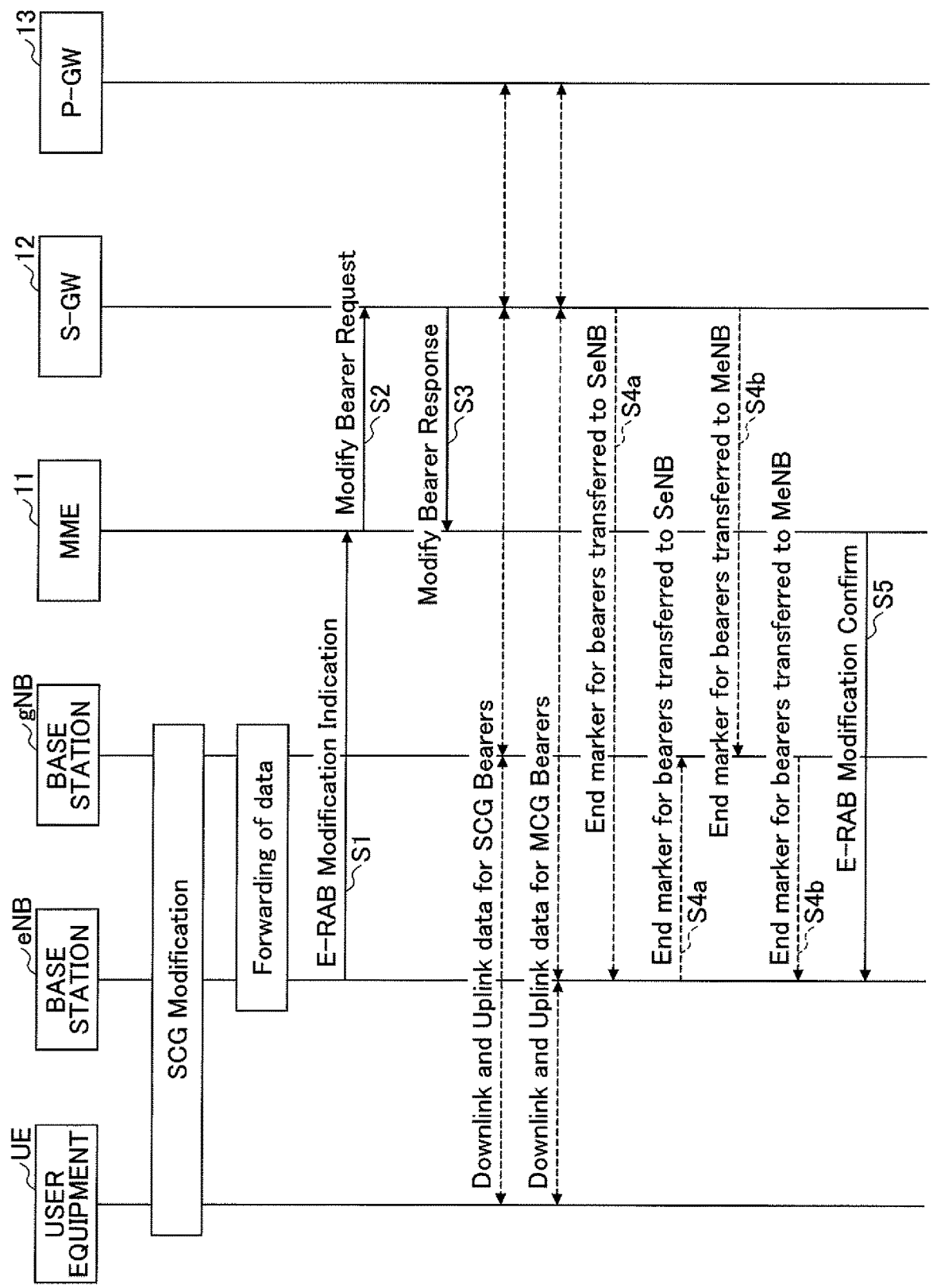
FIG. 7 is a diagram illustrating an exemplary procedure of adding/changing/removing in a base station gNB when using SCG bearer/split bearer.

FIG. 7 illustrates an exemplary sequence when setting a SCG bearer/split bearer. Since the procedure itself is described in None-Patent Document 2, detailed description thereof is omitted. It should be noted that, in FIG. 7, a secondary gNodeB may be referred to as a secondary RAN Node.

Process of Determining Whether or Not to Set SCG Bearer/Split Bearer

Next, a process of determining whether or not to set a SCG bearer/split bearer, which is performed by the base station eNB when the base station eNB receives a bearer setting request, will be described. It should be noted that the base station eNB may perform bearer setting based on its own decision even when it does not receive a bearer setting request from MME 11 or the like. Here, a case in which reception of a bearer setting request from MME 11 triggers the base station eNB to perform bearer setting will be described.

Further, among end-end bearers, the present embodiment particularly focuses on E-RAB as a bearer for a part that goes through a base station. Hereinafter, a bearer refers to E-RAB unless otherwise specified or unless it is clear from the context. Further, the bearer to be set is a U-Plane bearer.

Figure 8:
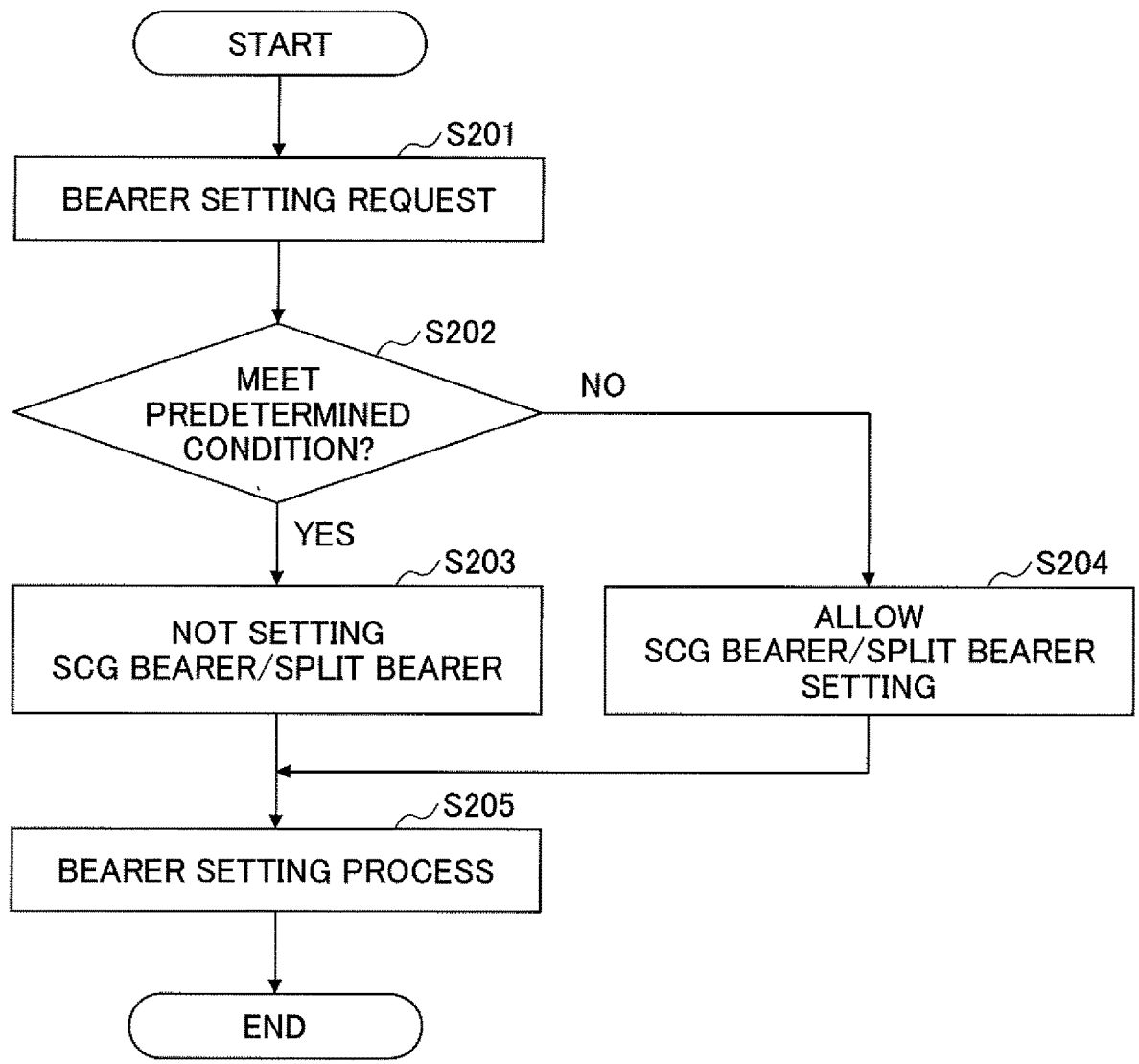
FIG. 8 is a flow chart of determining whether or not to use SCG bearer/split bearer.

FIG. 8 is a flowchart of a process of determining whether or not to set a SCG bearer/split bearer. Upon receiving a bearer setting request from MME 11 (S201), the base station eNB determines whether or not a predetermined condition concerning SCG bearer/split bearer setting is met (S202).

When the determination result at S202 is Yes (when the predetermined condition is met), the base station eNB decides not to set a SCG bearer/split bearer. Alternatively, the base station eNB may decide to suppress setting a SCG bearer/split bearer.

Suppressing may be performed such that first a restriction rate (K%) is determined, and then SCG bearer/split bearer setting is allowed only "N×K/100" times out of N times of bearer setting.

When the determination result at S203 is No (when the predetermined condition is not met), the base station eNB decides to allow SCG bearer/split bearer setting (S204).

Subsequently, the base station eNB performs bearer setting (S205). Here, when the process reaches S205 through S203 (not setting SCG bearer/split bearer), the base station sets a MCG bearer or MCG split bearer. Further, at S203, when it is decided to suppress SCG bearer/split bearer setting, the base station eNB sets a MCG bearer or MCG split bearer or a SCG bearer/split bearer in accordance with the restriction rate. Further, when the process reaches S205 through S204 (allowing SCG bearer/split bearer setting), the base station eNB sets SCG bearer/split bearer when it determines that SCG bearer/split bearer needs to be set based on, for example, bearer quality information (e.g., Qos Class Identifier (QCI)) or the like included in the bear setting request.

When setting a MCG bearer, S106 to S114 shown in FIG. 6 are performed as a bearer setting process. Further, when setting a SCG bearer/split bearer, for example, S1 to S5 shown in FIG. 7 are performed.

Although setting of a SCG bearer/split bearer is not performed in the present embodiment when the predetermined condition is met, setting of a SCG bearer/split bearer may not be performed when the predetermined condition is not met. However, "not setting a SCG bearer/split bearer when the predetermined condition is met" and "not setting a SCG bearer/split bearer when the predetermined condition is not met" have substantially the same meaning given that "not meeting a predetermined condition" is "a predetermined condition that is to be met."

DETERMINATION EXAMPLES

Next, determination examples (1) to (5) at above-described S202 will be described.

(1) when the base station eNB detects congestion in an apparatus (e.g., MME 11, S-GW 12, P-GW 13 or the like) in the core network (EPC 10), congestion in a transmission path in the core network (EPC 10), or congestion in either an apparatus or network through which an end-end bearer passes, the base station eNB determines that the predetermined condition is met and decides not to set a SCG bearer/split bearer.

As a result of the above process, it is possible to avoid streaming a larger amount of data through SCG bearer/split bearer or a further increase in signaling traffic associated with setting/changing/removing a SCG bearer/split bearer when the core network or the like is congested.

Detection of congestion refers to, for example, detecting that an amount of traffic that passes through an apparatus or a network is higher than a predetermined threshold value or detecting that delay in a network is larger than a predetermined threshold value.

The base station eNB may collect information on the apparatus/network traffic by itself to detect the congestion, or may detect the congestion by receiving congestion notification from MME 11 or OPS 30 as will be described below.

(2) When the base station eNB identifies the type of the requested bearer based on bearer quality information or the like included in the bearer setting request and detects that the bearer to be set is of the type that is predetermined (e.g., IMS audio), the base station eNB determines that a predetermined condition is met and decides not to set a SCG bearer/split bearer. Further, when the base station eNB detects, upon receiving a bearer setting request for a user equipment UE, that the bearer that is of the bearer type set in advance (e.g., IMS audio) has already been set, the base station eNB determines that a predetermined condition is met and decides not to set a SCG bearer/split bearer as a new bearer to be set. Further, for example, when the base station eNB detects based on bearer quality information (QCI) included in the bearer setting request that a bearer to be set is a bearer to which specific QCI is set, the base station eNB may determine that a predetermined condition is met and decide not to set a SCG bearer/split bearer.

As a result of the above process, it is possible to avoid occurrence of audio interruption resulting from switching of SCG bearer/split bearer associated with movement of user equipment UE.

(3) When the base station eNB detects based on core network identification information or APN included in a bearer setting request that a user equipment UE is to be connected to a predetermined core network or to a predetermined APN, the base station eNB determines that a predetermined condition is met and decides not to set a SCG bearer/split bearer. The predetermined core network may be an IoT-specific core network, for example.

As a result of the above process, it is possible to avoid an increase in signaling due to setting a SCG bearer/split bearer for a case where a SCG bearer/split bearer is no need to be used.

(4) Since the base station eNB is connected to the user equipment UE through C-Plane, the base station eNB is able to identify a transition of the state of the user equipment UE. When the base station eNB detects a transition to a predetermined state (e.g., transition to DRX (intermittent reception condition) or transition to non-DRX) at the time of the bear setting request, the base station eNB determines that a predetermined condition is met and decides not to set a SCG bearer/split bearer.

Further, the base station eNB monitors a data flow amount (uplink data flow amount or downlink data flow amount or total of uplink data flow amount and downlink data flow amount) between the user equipment UE and the base station eNB, determines that a predetermined condition is met when the value of the data flow amount is equal to or larger than a predetermined threshold value, and decides not to set a SCG bearer/split bearer.

Further, the base station eNB may monitor a throughput (uplink throughput or downlink throughput or total of uplink throughput and downlink throughput) between the user equipment UE and the base station eNB, determine that a predetermined condition is met when the value of the throughput is equal to or larger than a predetermined threshold value, and decide not to set a SCG bearer/split bearer.

Further, the base station eNB may monitor delay (uplink delay or downlink delay or round trip delay) between the user equipment UE and the base station eNB, determine that a predetermined condition is met when the value of the delay is equal to or larger than a predetermined threshold value, and decide not to set a SCG bearer/split bearer.

By not setting a SCG bearer/split bearer when a data flow amount or the like is high as described above, it is possible to curve a significant increase in load on the core network side (in particular, load of 5G facility).

(5) When the base station eNB detects a predetermined number of times of handover of a predetermined type (e.g., such as 5G configuration (addition of SeNB), X2-HO, S1-HO) in the user equipment UE within a predetermined time period in the past from at the time of the determination of bearer setting (when performing S202), the base station eNB determines that a predetermined condition is met and decides not to set a SCG bearer/split bearer.

Further, when the base station eNB detects that the user equipment UE is on the move at the time of the determination of bearer setting (when performing S202) (e.g., when detects that the distance of the movement within a predetermined time is equal to or larger than a predetermined threshold value), the base station eNB may determine that a predetermined condition is met and decide not to set a SCG bearer/split bearer.

At rail roads and highways, during lunch time in a business district, during morning commute and evening commute or when the user equipment is on the move, an increase in signaling amount associated with switching of SCG bearer/split bearer is expected. By performing the above process a further increase in an amount of signaling due to SCG bearer/split bearer setting can be avoided. It should be noted that both the HO and the movement as described above are exemplary events that lead to an increase in an amount of signaling between the user equipment UE and the base station eNB.

Further, when the base station eNB determines the type of the user equipment UE based on identification information of the user equipment UE and detects that the user equipment UE is of a certain type (e.g., IoT terminal), the base station eNB may determine that a predetermined condition is met and decide not to set a SCG bearer/split bearer.

Further, when the base station eNB determines the position of the user equipment UE based on positional information of the user equipment UE and detects that the position is at a certain location, the base station eNB may determine that a predetermined condition is met and decide not to set a SCG bearer/split bearer.

Further, when the time of the determination of bearer setting (when performing S202) is certain time (e.g., between 12 PM and 1 PM), the base station eNB may determine that a predetermined condition is met and decide not to set a SCG bearer/split bearer.

Example of Using Notification from MME 10, OPS 30

As described above, upon receiving a bearer setting request, the base station eNB can make determination at S202 in FIG. 8 based on notification information from MME 11 or OPS 30. For example, upon receiving notification information indicating whether or not there is congestion as described in (1) above, the base station eNB determines that a predetermined condition is met and decides not to set a SCG bearer/split bearer.

Further, the base station eNB may determine whether or not a predetermined condition is met by receiving the value of amount of traffic for determining whether or not there is congestion as described in (1) above and comparing the value with a threshold value.

Further, the base station eNB may receive from MME 11 or OPS 30 notification information that directly indicates whether or not to set a SCG bearer/split bearer (allowing SCG bearer/split bearer setting or not allowing SCG bearer/split bearer setting) and determine whether or not to set a SCG bearer/split bearer in accordance with the notification information. Further, the base station eNB may receive from MME 11 or OPS 30 notification information indicating that SCG bearer/split bearer setting should be suppressed (e.g., restriction rate (K%) as described above) and determine, in accordance with the notification information, whether or not to set a SCG bearer/split bearer. The operation of the base station eNB when suppressing SCG bearer/split bearer setting is as described above.

Further, when MME 11 or OPS 30 detects from the distribution of urgency information that network congestion is to be expected, MME 11 or OPS 30 may send to the base station eNB notification information indicating not allowing SCG bearer/split bearer setting.

MME 11 or OPS 30 may send to the base station eNB each notification information described above at a certain time interval or when receiving from the base station eNB a request to send notification information.

When the base station eNB performs SCG bearer/split bearer setting, the base station eNB may obtain the time at which the bearer was set (a length of time from the point at which the setting completed to the current time) and the data flow amount through the bearer during the time period, and may notify MME 11 or OPS 30 the values of the length and the data flow amount. And on the basis of these values received from each base station, MME 11 or OPS 30 can determine whether or not to set a new bearer/split bearer.

Figure 9:
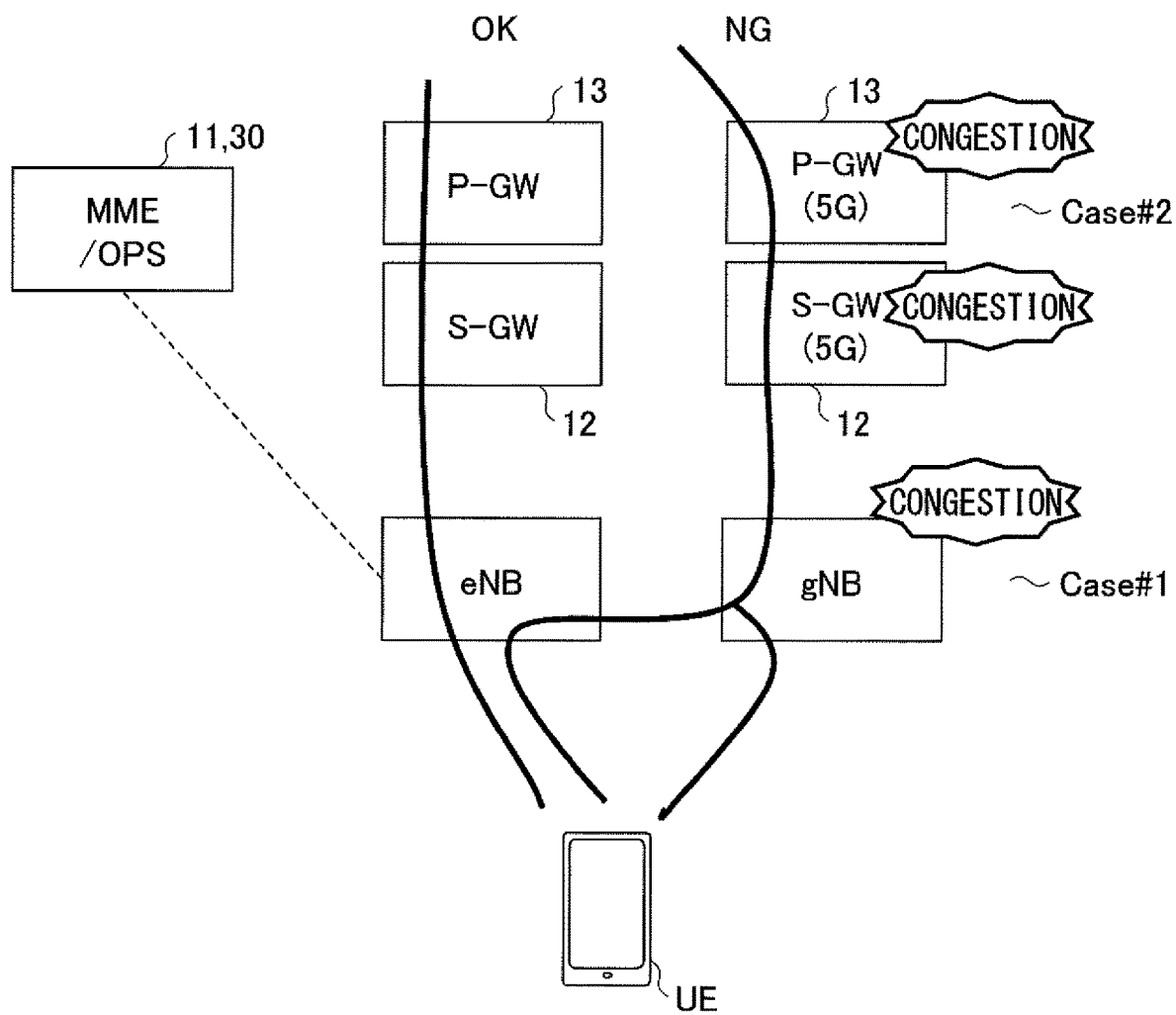
FIG. 9 is a diagram illustrating an example of determining whether or not to use SCG bearer/split bearer based on notification from MME 10 or OPS 30.

FIG. 9 is a diagram illustrating an exemplary network condition when using notification from MME10, OPS 30. In the example shown in FIG. 9, as S-GW 12 and P-GW 13, S-GW 12 and P-GW 13 for processing 5G traffic and other S-GW 12 and P-GW 13 are provided. S-GW (5G) 12 and P-GW (5G) 13 denote S-GW 12 and P-GW 13 for processing 5G traffic.

As shown in FIG. 9, in Case #1, it is assumed that the base station gNB as a radio 5G facility is congested (or at fault). In this case, since the base station eNB can detect that the base station gNB is congested (or at fault), the base station gNB can decide not to perform SCG bearer/split bearer setting.

In Case #2, it is assumed that the base station gNB is not congested (or not at fault) but a 5G facility on the core side (S-GW (5G) 12, P-GW (5G) 13) is congested (or at fault). In this case, MME 10 or OPS 30 detects the congestion (failure) and sends to the base station eNB information notifying that a SCG bearer/split bear should not be set. Consequently, it is possible to prevent load of the core side 5G facility (S-GW (5G) 12, P-GW (5G) 13) from becoming excessive or disruption of service for the user equipment UE from occurring.

Figure 10:
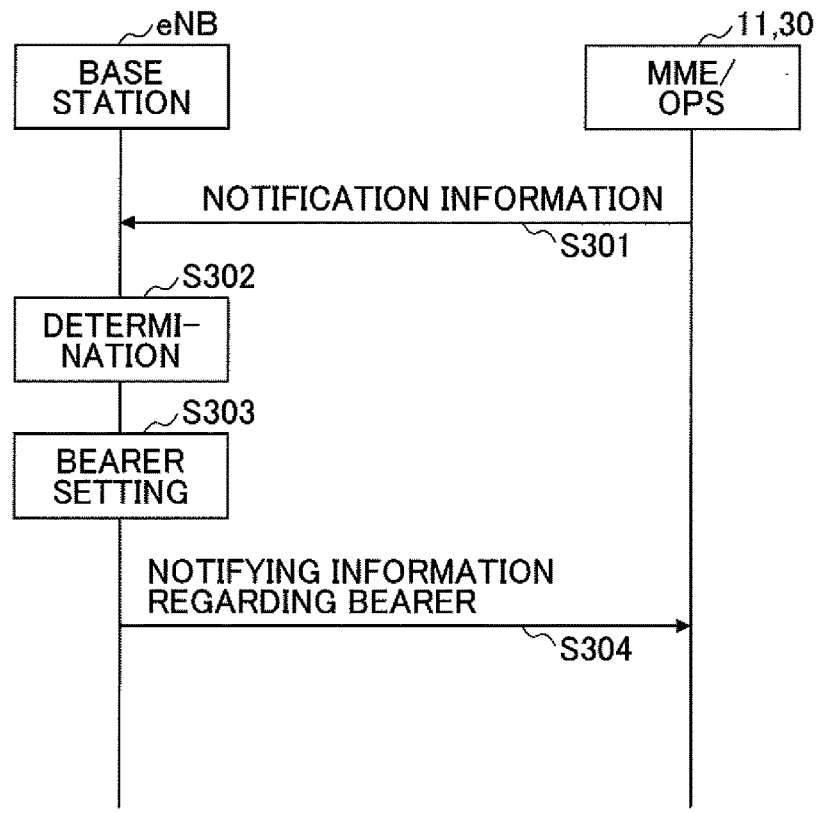
FIG. 10 is a sequence diagram of determining whether or not to use SCG bearer/split bearer based on notification from MME 10 or OPS 30.

FIG. 10 illustrates an exemplary sequence in which notification from MME 11, OPS 30 is used. In the example shown in FIG. 10, MME 11/OPS 30 collects information indicating the condition of an apparatus or transmission path in the core network (EPC 10), for example, regularly. And on the basis of the collected information, MME 11/OPS 30 can determine whether or not congestion or failure is taking place in an apparatus or transmission channel in the core network (EPC 10).

As shown in FIG. 10, MME 11 (or OPS 30) sends to the base station eNB notification information indicating whether or not there is congestion in an apparatus or transmission path in the core network (EPC 10) (S301). When the base station eNB that received the notification performs bearer setting, e.g., when receiving notification that an apparatus or transmission path of the core network is congested, the base station eNB decides not to set a SCG bearer/split bearer (S302). Further, when the base station eNB receives notification indicating that the core network is not congested, the base station eNB decides to allow SCG bearer/split bearer setting (S302). And the base station eNB performs bearer setting.

At S303, when the base station eNB performs SCG bearer/split bearer setting, the base station eNB notifies MME 11 (or OPS 30) information on the bearer such as a bearer data flow amount (S304).

By performing the processes described in the present embodiment, it is possible to avoid an increase in core network load resulting from frequent switching of SCG bearer/split bearer such as setting/releasing.

Apparatus Configuration

Next, an exemplary functional configuration of the base station eNB that performs the process operations described above and of a communication control apparatus 200 that functions as MME 11 or OPS will be described. Each apparatus has all of the functions described in the present embodiment. However, each apparatus may have only a part of all of the functions described in the present embodiment.

Base Station

Figure 11:
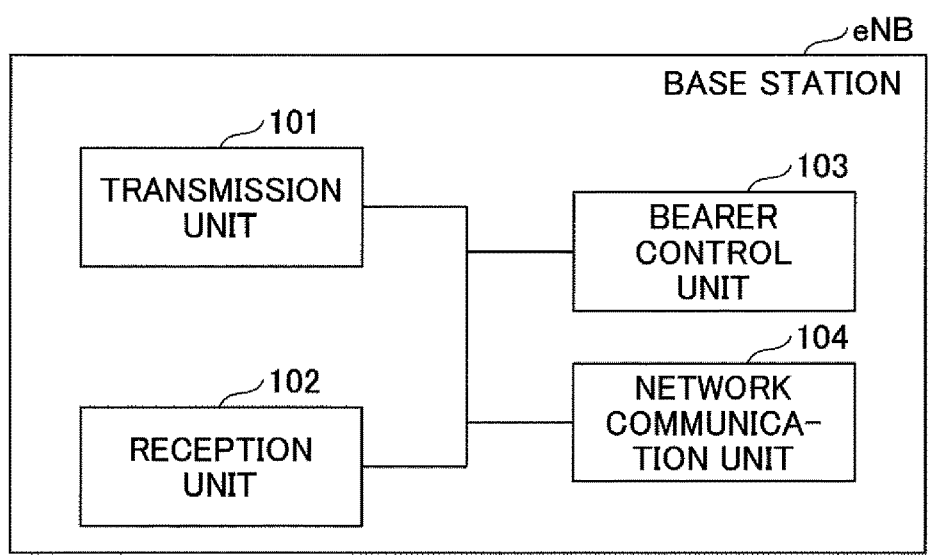
FIG. 11 is a diagram illustrating an example of functional configuration of a base station eNB according to the embodiment.

FIG. 11 is a diagram illustrating one example of a functional configuration of the base station eNB. As shown in FIG. 11, the base station eNB has a transmission unit 101, a reception unit 102, a bearer control unit 103, and a network communication unit 104. It should be noted that the functional configuration as shown in FIG. 11 is merely an example. Any functional division or any name may be used as long as the operation according to the preset embodiment can be performed. The transmission unit and the reception unit may be referred to as a transmitter and a receiver, respectively.

The transmission unit 101 includes a function of generating a signal to be sent to the user equipment UE and sending the signal wirelessly. The reception unit 102 includes a function of receiving a variety of signals sent from the user equipment UE and obtaining, for example, higher layer information from the received signals.

The bearer control unit 103 performs the bearer setting determination process and the bear setting process as described in the present embodiment. The network communication unit 104 performs communications with the core network (EPC 10), with the communication control apparatus 200 and with other base stations.

For example, the network communication unit 104 is configured to receive a bearer setting request from the core network. The bearer control unit 103 is configured to determine, when setting a bearer based on the bearer setting request, whether or not a predetermined condition is met, and when the predetermined condition is met, to decide not to set the bearer connecting the base station gNB and the core network to each other or to restrain from setting the bearer.

The bearer control unit 103 determines that a predetermined condition is met when detecting congestion or a failure in the core network, when setting a bearer of a certain type, when detecting that the user equipment UE is to be connected to a certain destination or when detecting an event that increases an amount of signaling between the user equipment UE and the base station.

The bearer control unit 103 may determine whether or not a predetermined condition is met based on notification information to be received from MME or an operation system in the core network.

Communication Control Apparatus

Figure 12:
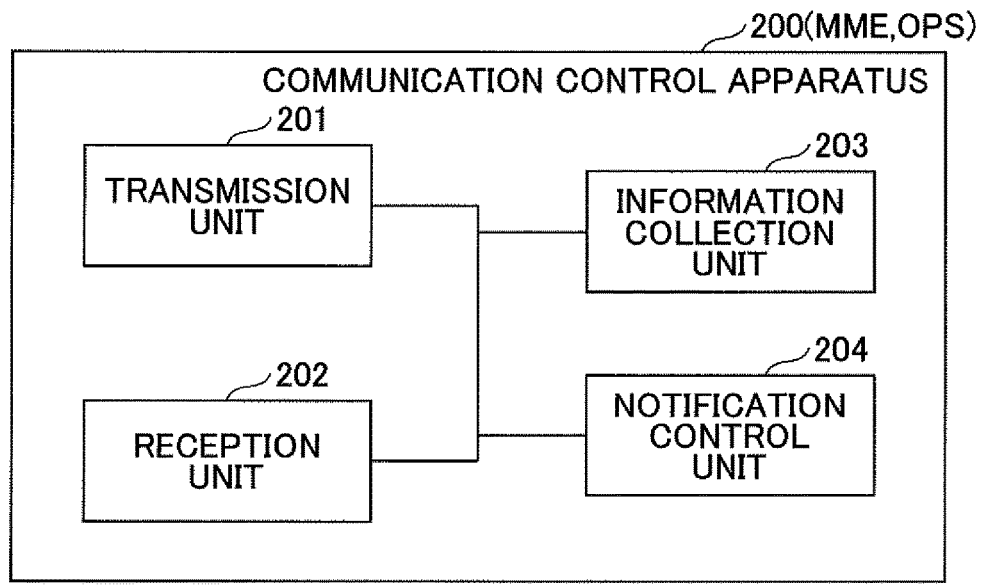
FIG. 12 is a diagram illustrating an example of functional configuration of a communication control apparatus 200 (MME 11/OPS 30) according to the embodiment.

FIG. 12 is a diagram illustrating one example of a functional configuration of a communication control apparatus 200 that functions as MME 11 or OPS 30. As shown in FIG. 12, the communication control apparatus 200 includes a transmission unit 201, a reception unit 202, an information collection unit 203 and a notification control unit 204. It should be noted that the functional configuration shown in FIG. 12 is merely an example. Any functional division or any name may be used as long as the operation according to the preset embodiment can be performed. The transmission unit and the reception unit may be referred to as a transmitter and a receiver, respectively.

The transmission unit 201 includes a function of generating a signal (e.g., IP packet) to be sent to the base station eNB and sending the signal. The reception unit 202 includes a function of receiving a variety of pieces of information sent from the base station eNB and storing the received information into a memory or the like. The information collection unit 203 collects a variety of pieces of information on a congestion or failure from a device, a transmission channel, or the like of the core network (EPC 10), and stores the collected information into the memory or the like. The notification control unit 204 determines whether or not there is congestion or failure based on the collected information and sends to the base station eNB notification information (e.g., information indicating whether or not to set a SCG bearer/split bearer, restraining setting) depending on the determination.

Hardware Configuration

In the block diagrams (FIGS. 11 to 12) used in the description of the above embodiment, the blocks of the functional units are illustrated. The functional blocks (configuring units) are implemented by any combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 13:
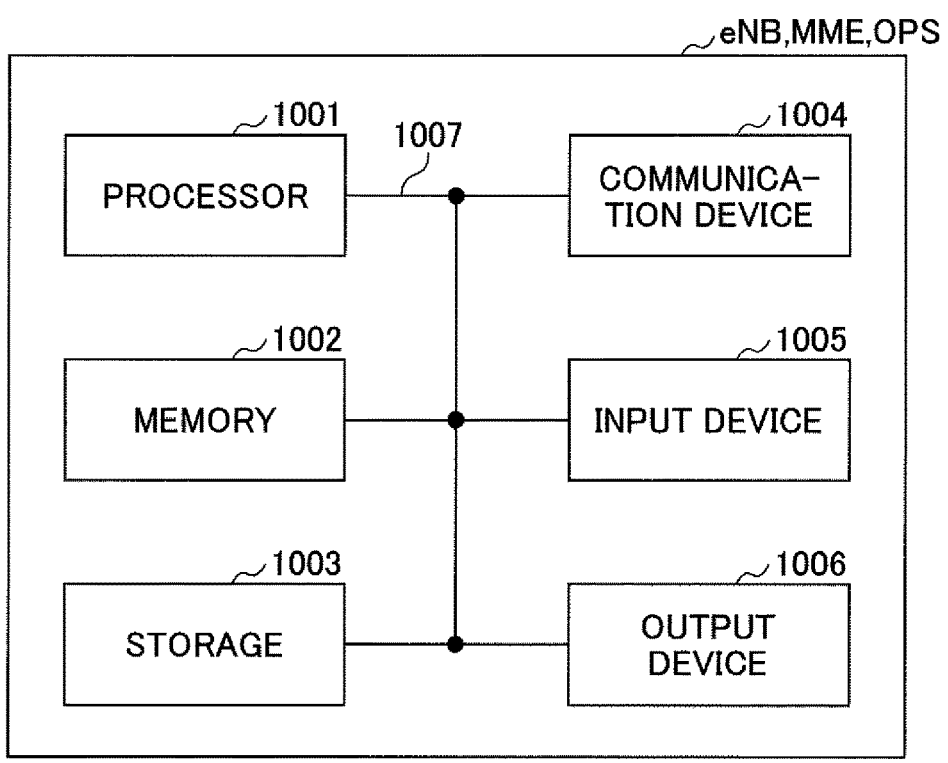
FIG. 13 is a diagram illustrating an example of a hardware configuration of apparatuses according to the embodiment.

For example, each of the base station eNB and the communication control apparatus 200 (MME 11 or OPS 30) in one embodiment of the present invention may function as a computer that performs the process of the present invention. FIG. 13 is a diagram illustrating an example of a hardware configuration of the base station eNB and the communication control apparatus 200 according to one embodiment of the present invention. Each of the base station eNB and the communication control apparatus 200 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the base station eNB and the communication control apparatus 200 may be configured to include one or more devices denoted by 1001 to 1006 illustrated in the drawing or may be configured without including some devices.

Each function in each of the base station eNB and the communication control apparatus 200 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the functions of the base station eNB and the communication control apparatus 200 may be implemented by a control program which is stored in the memory 1002 and operates on the processor 1001. Various types of processes are described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), etc. The memory 1002 is also referred to as a "register," a "cache," a "main memory," or the like. The memory 1002 can store programs (program codes), software modules, or the like which are executable for carrying out the signal transmission method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a "network device," a "network controller," a "network card," a "communication module," or the like. For example, the transmission unit, the reception unit, and the network communication unit of each device may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrated (for example, a touch panel).

The devices, such as the processor 1001 and the memory 1002, may be connected via the bus 1007 to communicate information with each other. The bus 1007 may be configured with a single bus or may be configured with different buses between the devices.

Further, each of the base station eNB and the communication control apparatus 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these hardware components.

Summary of Embodiment

As described above, the present embodiment provides a base station used in a communication system comprising a core network, and a first and second base stations both of which are connected to the core network, wherein the base station being used as the first base station, the base station comprising: a network communication unit that receives a bearer setting request from the core network; and a bearer control unit that determines, when performing bearer setting based on the bearer setting request, whether or not a predetermined condition is met, and, when the predetermined condition is met, decides not to set a bearer that connects the second base station and the core network to each other or to restrain from setting the bearer.

As a result of the above configuration, it is possible to restrain switching of bearers in a communication system having a first base station and a second base station and to avoid an increase in core network load.

The bearer control unit may determine that a predetermined condition is met when detecting congestion or a failure in the core network, when setting a bearer of a certain type, when setting a bearer to which certain bearer quality information is set, when detecting that a user equipment to which the bearer is to be set is to be connected to a certain destination, when detecting that a user equipment to which the bearer is to be set is a user equipment of a certain type, when detecting movement of a user equipment to which the bearer is to be set, when detecting that a user equipment to which the bearer is to be set is positioned at a certain location, when time for setting the bearer is within a certain time period or when detecting an event that increases an amount of signaling between the user equipment and the base station. As a result of this configuration, it is possible to appropriately implement the conditional determination.

The bearer control unit may determine whether or not the predetermined condition is met based on notification information received from MME or operation system in the core network.

The first base station may be a master base station in dual connectivity, and the second base station may be a secondary base station in dual connectivity, and the bearer that connects the second base station and the core network to each other may be a SCG bearer or SCG split bearer. As a result of this configuration, it is possible to appropriately determine whether or not to set a SCG bearer or SCG split bearer.

Further, the present embodiment provides a communication control apparatus in a communication system comprising a core network, and first and second base stations both of which are connected to the core network, the communication control apparatus comprising: an information collection unit that collects information indicating a condition of a device or a transmission channel in the core network; a notification control unit that sends to the first base station notification information indicating whether or not to set a bearer connecting the second base station and the core network to each other or restraining setting of the bearer, based on the information collected by the information collecting unit.

As a result of the above configuration, it is possible to restrain switching of bearers in a communication system having a first base station and a second base station and to avoid an increase in core network load.

The notification control unit sends to the first base station, when congestion or failure in the core network is detected, notification information directing the first base station not to set the bearer or to restrain from setting the bearer. As a result of this configuration, when congestion or failure in a core network occurs, a base station can make an appropriate determination not to set a bearer.

Supplemental Embodiments

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components. The order of steps of the process procedure described in the present embodiment may be interchanged unless incompatible. For the sake of simplicity of the process description, the functional block diagrams have been used to describe the base station eNB and the communication control apparatus 200. However, such devices may be implemented by hardware, software or a combination of hardware and software. Software operated by a processor included in each device according to the embodiment of the present invention may be stored in random access memory (RAM), flash memory, read only memory (ROM), EPROM, EEPROM, a register, hard disk drive (HDD), a removable disk, CD-Rom, database, server, or any other appropriate storage medium.

Notification of information is not limited to the aspects/embodiments described in this specification, but may be performed using other methods. For example, the notification of information may be performed physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, and the like of the embodiment/examples described above in this specification may be changed in the order as long as they are not incompatible with each other. For example, in the method described in this specification, various steps as elements are described in an exemplary order and the method is not limited to the described order.

The certain operations described in the specification as being performed by a base station eNB may be performed by a upper node in some cases. Further, the certain operations described in the specification as being performed by a base station eNB may be performed by the base station gNB. In a network formed by one or more network nodes having a base station eNB, it is clear that various operations performed for connection with a user equipment UE could be performed by a network node other than a base station eNB and/or a base station eNB (e.g., MME or S-GW may be envisioned but not limited thereto). In the above, although a case of using one network node other than a base station eNB has been described as an example, a combination of a plurality other network nodes (e.g., MME and S-GW) may be used.

The aspects described in this specification may be used alone, may be used in combination, or may be switched with implementation thereof.

The user equipment UE may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station eNB may be referred to as an NodeB (NB), a base station or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

The invention is not limited to the above-mentioned embodiment, but various modifications, corrections, alternatives, replacements, and the like are included in the invention without departing from the spirit of the invention.

This patent application is based on and claims priority to Japanese patent application No. 2017-197234 filed on Oct. 10, 2017, and the entire contents of the Japanese Patent Application No. 2017-197234 are incorporated herein by reference.

DESCRIPTION OF REFERENCE NUMERALS

10 EPC
eNB, gNB Base Station
UE User Equipment
11 MME
12 S-GW
13 P-GW
14 PCRF
20 PDN
30 OPS
101 Transmission Unit
102 Reception Unit
104 Bearer Control Unit
200 Network Communication Unit
201 Transmission Unit
202 Reception Unit
203 Information Collection Unit
204 Notification Control
1001 Processor
1002 Memory
1003 Storage
1004 Communication Device
1005 Input Device
1006 Output Device

The invention claimed is:

1. A base station comprising:
a receiver that receives notification information from a network apparatus; and
a processor that, if determining that a predetermined condition is met based on the notification information and local configuration data, decides not to set a split bearer that connects a secondary node of New Radio (NR) and a core network, and if determining that the predetermined condition is not met based on the notification information and local configuration data, decides to set the split bearer,
wherein the base station supports Dual connectivity with NR, and the secondary node of NR is a gNB,
wherein the predetermined condition is that a user equipment to which a bearer is to be set is a user equipment of a certain type and relates to handover configurations of a predetermined type, and the user equipment of the certain type is a user equipment that is not allowed to use NR, and
wherein the processor, upon determining that the base station has a restriction, disables the split bearer and reconfigures the split bearer as a master cell group (MCG) bearer connecting to the core network according to the restriction.

2. A control method executed by a base station, comprising:
- receiving notification information from a network apparatus; and
- if determining that a predetermined condition is met based on the notification information and local configuration data, deciding not to set a split bearer that connects a secondary node of New Radio (NR) and a core network, and if determining that the predetermined condition is not met based on the notification information and local configuration data, deciding to set the split bearer,
- wherein the base station supports Dual connectivity with NR, and the secondary node of NR is a gNB,
- wherein the predetermined condition is that a user equipment to which a bearer is to be set is a user equipment of a certain type and relates to handover configurations of a predetermined type, and the user equipment of the certain type is a user equipment that is not allowed to use NR, and
- wherein the base station, upon determining that the base station has a restriction, disables the split bearer and reconfigures the split bearer as a master cell group (MCG) bearer connecting to the core network according to the restriction.

* * * * *